June 28, 1938. K. E. GOIT 2,121,963

COVER FOR STEERING WHEEL RIMS

Filed Feb. 1, 1937

Inventor
KENNETH E. GOIT
By Paul, Paul Moore
ATTORNEYS

Patented June 28, 1938

2,121,963

UNITED STATES PATENT OFFICE 2,121,963

COVER FOR STEERING WHEEL RIMS

Kenneth E. Goit, Minneapolis, Minn.

Application February 1, 1937, Serial No. 123,379

5 Claims. (Cl. 74—558)

This invention relates to improvements in covers particularly adapted for use on automobile steering wheel rims or handles and has for an object to provide an easily attachable and removable covering which will entirely cover the rim and which will not slip circumferentially, and which will substantially prevent conduction of heat or cold from the rim to the hands of the driver. As is well known the ordinary steering wheels "feel" cold to the hands in winter and warm to the hands in summer and thus to such an extent as to make it markedly noticeable and uncomfortable to some drivers. Driving with cold hands is particularly objectionable, even dangerous.

A particular object therefore is to eliminate or materially reduce conduction, and make for the maximum of comfort.

I am aware that various attempts have been made to provide a practicable device of this kind, but those devices with which I am acquainted are clumsy or expensive or inefficient and have been attached by metal plates on straps attached to plates. In some instances snap fasteners have been used. Metal plates scratch the rim and fastening devices are generally objectionable.

I have found that to make a practicable device a base material, preferably elastic in nature should be provided, and such material should act to prevent circumferential slipping. On this base should be mounted integrally, a layer of non-conducting material.

I have experimented with various materials and have found that heavy piled fabrics commonly used in heavy clothing can be attached to an elastic base such as rubber, by cementing or by vulcanization in a mold or by a dipping process. I have also found that various types of fur, such as of sheep, rabbit, and furs of other animals can be combined with an elastic base by cementing or vulcanization to give a durable neat and efficient device at relatively small cost. I have also found that light leather like suede, is applicable for summer use and this material can be cemented or vulcanized on the rubber or elastic tubular base in the same manner as pile or pelage materials, such as woven fabrics and furs.

Another object of this invention is to provide a non-conducting cover which will not slip circumferentially, and which can be quickly applied and removed, all without the use of hooks, eyes, snap fasteners or other metallic or leather bands or fastenings.

Another object is to provide a device which is neat in appearance and which will fit therein snugly and cover substantially the entire rim, so that there can be practically no direct contact between the rim and the hand of the user.

Another object is to so construct the elastic base ring that no great amount of stretch is necessary in applying it to the rim, and so that after application the base is under only little if any elastic stretch or tension stress. This is accomplished by making the inner circumference of the base substantially equal to the outer circumference of the rim.

I have also found it advisable in some instances to cut woven fabric material on the bias to obtain the greatest amount of stretch possible so that although the fabric is integrally attached to the rubber it may to some extent stretch with the rubber. This bias cutting may in some instances be dispensed with and I provide for stretch of the rubber independently of any stretch of the non-conducting layer, by end abutting portions of the layer, whereby to provide for separation at the joint and thus allow the band to be stretched over the wheel and thereafter to closely conform to the rim, but not necessarily under tension.

Inasmuch as I believe myself the first to vulcanize or cement a non-conducting material to a tubular rubber base for the purpose herein I claim the device either in the form of a single segment or plurality of segments abutting or non-abutting and which are split to be easily applied or to provide a ring which can be placed over the rim in the manner of a rubber band to thereafter engage the rim both circumferentially and transversely.

Features include all details of construction shown along with the broader ideas of means inherent in the disclosure.

Objects, features and advantages of the invention will be set forth in the description of the drawing forming part of this application, and in said drawing—

Figure 1:
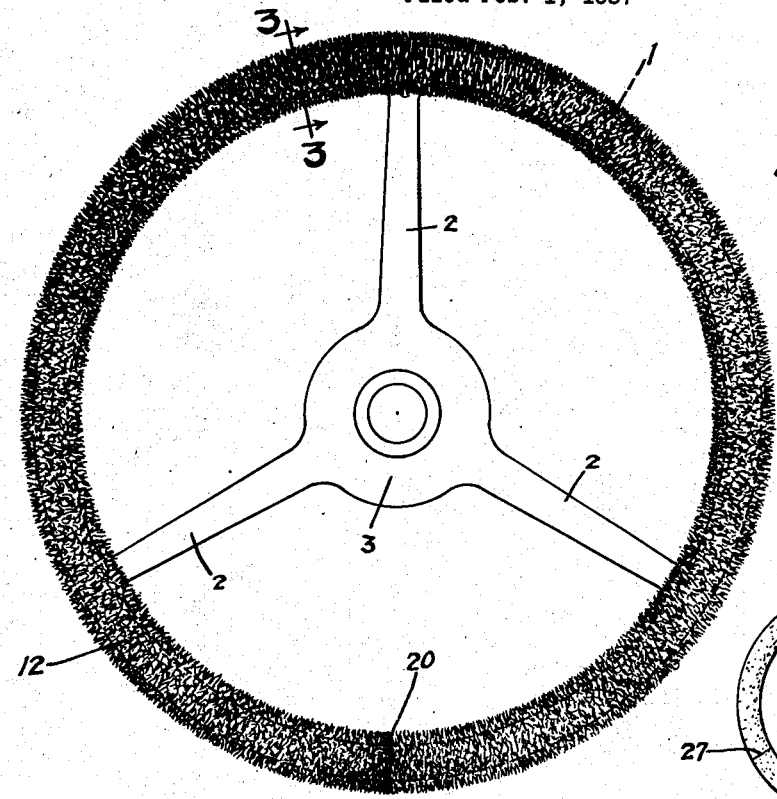
Figure 1 is a plan view of a steering, or equivalent, wheel showing my device applied to the rim, and showing a single piece base ring and a single piece cover layer thereon, the ends of the layer beng abutted but separable.
Figures 3, 6, 8:
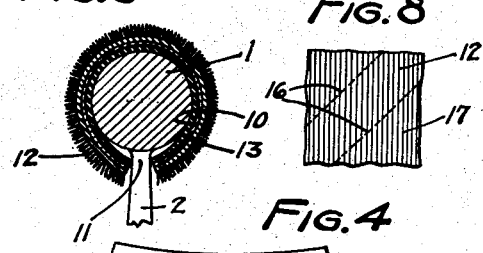
Figure 3 is a transverse section on line 3—3 of Figure 1 illustrating how the device conforms to the configuration of the wheel transversely and showing the outer covering material to be a woven pile fabric.
Figure 6 is a diagrammatic view showing the various layers in relation to one another and in relation to the rim.
Figure 8 is a fragmentary view representing a woven piece fabric and illustrating how the non-conducting material is cut therefrom on the bias.

In the drawing, numeral 1 indicates the rim of a steering wheel the spokes of which are indicated at 2, and hub at 3. Referring first to Figures 3 and 6, numeral 10 generally indicates a tubular base of elastic material, preferably of thin flexible rubber of uniform thickness and having an inside surface area substantially equal to that of the surface area of the rim. This tubular base is split circumferentially at its inner side as at 11, to facilitate introduction over the rim, to the position shown in Figures 1 and 3.

The base material is preferably thin and of uniform thickness so that it has little or no gripping action on the rim. The material usually initially conforms transversely in about the manner shown in Figure 3 and the inner edges of the slitted portion are completely brought against the inner side of the rim by gripping action.

Attached to the outside of this elastic base material is a layer 12 of relatively non-elastic material which is substantially a non-conductor of heat and cold. This material is attached by cementing or by vulcanizing. The numeral 13 indicates some connecting material which is meant to represent a cement or to represent an area of vulcanization. In any event this outer layer is integrally attached, and its material may be woven napped fabric or the fur of animals. Leather may be used or any other material which is non-heat and cold conducting, but a heavy napped woven material is preferred because of its "feel" to the hand and because of its cheapness, and because it can be cut on the bias to condition it to stretch to some extent. This layer 12 whatever the material covers substantially the entire outer surface of the tubular base as shown in Figure 3.

The rim cover as a whole is so designed that when it is in position on the wheel the rubber base is not under any substantial elastic tension. In other words, the rubber material is not under any appreciable stretch. The fit, however, is sufficiently snug so that the base will not slip circumferentially with reference to the rim.

Figure 9:
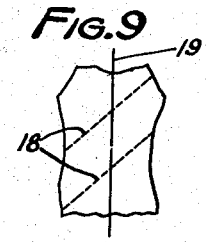
Figure 9 is a fragmentary view of a piece of any suitable pelage showing how this non-conducting material is also cut on the bias.

The cover material 12 whether made from animal pelage or from woven fabric is preferably cut on the bias as indicated at 16 in Figure 8, the vertical shade lines 17 indicating the warp threads of the woven fabric. The lines 18 of Figure 9 indicate that the non-conducting material when cut from pelt is also cut on the bias with reference to a line 19 which extends longitudinally of the skin.

Figure 4:
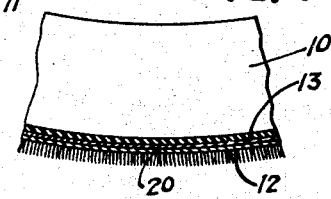
Figure 4 is a fragmentary longitudinal section showing how the ends of the non-conducting material are end abutted to allow stretch of the inner elastic layer or base.

By thus cutting the fabric or pelage a slight degree of stretch is allowed but generally speaking the tubular base and the covering may be considered respectively as elastic and non-elastic. To permit sufficient stretch therefor of the tubular base to allow of its application to the rim, the covering material is split as at 20 and the end portions are abutted but separable, see Figures 4 and 5.

Figure 5:
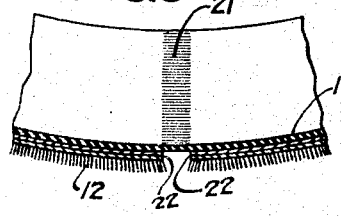
Figure 5 shows the stretching action in the neighborhood of the abutted ends.

The shading 21 in Figure 5 represents the stretched areas of the base material, and it is seen that the ends 22 of the cover material 12 are separated. This stretch is sufficient as before stated to allow introduction over the wheel. After introduction the ends 22 again assume the end-abutted relation shown in Figures 1, 2 and 4. The base ring before application to the wheel is flexible and is easily handled. It may be spoken of as "limp".

Figure 2:
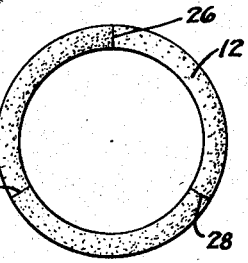
Figure 2 is a view of a modification of a cover in which the non-conducting material is in three sections with the ends abutted but separable to allow of a greater degree of stretch of the base ring.
Figure 7:
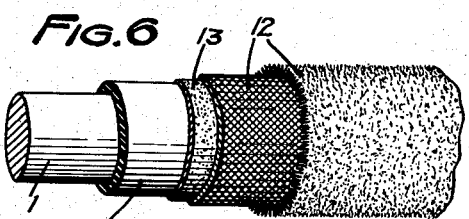
Figure 7 is a transverse section similar to Figure 3 but showing a modification in which pelage or fur such, as sheep wool, is used as a covering material.

In Figure 2 the covering is shown as composed of three sections with ends abutted at 26, 27, and 28. Of course in the device as made the lines of abutment are hardly discernible so that a very neat appearance is obtained particularly when woven fabric or leather is used as a covering. In Figure 7 has been shown a modification in which sheep wool is used. This wool is indicated at 30 and it is attached by any suitable means indicated at 31 such as by vulcanization or cementing to the elastic tubular base 10.

Figure 10:
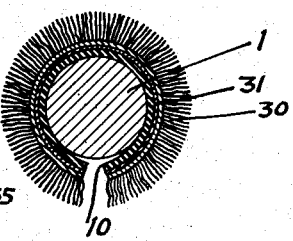
Figure 10 is a view of a modification in which the base material is not elastic except for a small elastic insert, in the region of which the cover layer ends are abutted and made separable.

Another modification is shown in Figure 10, in which the tubular base 35 is of non-elastic material, and has therein one or more elastic inserts 36. The ends of the non-conducting material are abutted, but separable as at 38, and the cover material is attached by cement or vulcanization as at 39.

I believe myself the first to integrally attach non-conducting material to a base which can be held in place without the use of devices other than are inherent in the structure of the base itself.

I claim as my invention:

1. A cover for the rim of a vehicle steering wheel consisting of a continuous unbroken tubular inner ring of elastic material and a non-elastic tubular outer ring of non-heat-and-cold conducting material encircling the inner ring and secured thereto, said outer ring being split to permit stretch of the inner ring in the region of said split, said two rings also being split circumferentially at their inner sides to facilitate introduction, by stretching the inner ring, over the rim.

2. A cover for the rim of a vehicle steering wheel consisting of a continuous unbroken tubular inner ring of elastic material and a non-elastic outer ring of non-heat and cold conducting material encircling the inner ring and secured thereto, said outer ring being transversely divided with the end portions thereof in abutted but separable relation to permit stretch of the inner ring in the region of abutment, said two rings also being split circumferentially at their inner sides to facilitate introduction, by stretching the inner ring, over the rim.

3. A cover for the rim of a vehicle steering wheel consisting of a continuous unbroken tubular inner ring of elastic material and an expansible non-heat and cold conducting outer ring of woven fabric encircling and secured to the inner ring, said two rings being split circumferentially at their inner sides to permit the cover to be expanded over the rim.

4. A cover for the rim of a vehicle steering wheel consisting of a continuous unbroken tubular inner ring of elastic material and a non-heat and cold conducting expansible outer ring comprising a circumferentially extending strip of bias cut woven fabric encircling and secured to the inner ring, said two rings being split circumferentially at their inner sides to permit the cover to be expanded over the rim.

5. A cover for the rim of a vehicle steering wheel consisting of a continuous unbroken tubular inner ring of elastic material and a separate, non-heat and cold conducting expansible outer ring of pile material encircling and secured to the inner ring, said two rings being split circumferentially of their inner sides to permit the cover to be expanded over the rim.

KENNETH E. GOIT.